US005453257A

United States Patent [19]
Diep et al.

[11] Patent Number: 5,453,257
[45] Date of Patent: Sep. 26, 1995

[54] PROCESS FOR ADJUSTING THE OPTIMUM EFFLUENT TEMPERATURE OF A NITROGEN OXIDES REDUCING TREATMENT AGENT

[75] Inventors: Daniel V. Diep, Aurora; M. Linda Lin, Naperville, both of Ill.

[73] Assignee: Nalco Fuel Tech, Naperville, Ill.

[21] Appl. No.: 960,890

[22] Filed: Oct. 14, 1992

[51] Int. Cl.⁶ .................................................. C01B 21/04
[52] U.S. Cl. .................................................. 423/235
[58] Field of Search .............................. 423/235, 235 D, 423/212 R

[56] References Cited

U.S. PATENT DOCUMENTS

| | | | |
|---|---|---|---|
| 3,399,145 | 8/1968 | Martinek et al. | 252/309 |
| 3,490,237 | 1/1970 | Lissant | 60/217 |
| 3,637,357 | 1/1972 | Nixon et al. | 44/51 |
| 3,900,554 | 8/1975 | Lyon | 423/235 |
| 4,083,698 | 4/1978 | Wenzel et al. | 44/51 |
| 4,162,143 | 7/1979 | Yount, III | 44/51 |
| 4,173,455 | 11/1979 | Fodor et al. | 44/51 |
| 4,199,326 | 4/1980 | Fung | 44/51 |
| 4,208,386 | 6/1980 | Arand et al. | 423/235 |
| 4,297,107 | 10/1981 | Boehmke | 44/51 |
| 4,325,924 | 4/1982 | Arand et al. | 423/235 |
| 4,378,230 | 3/1983 | Rhee | 44/51 |
| 4,392,865 | 7/1983 | Grosse et al. | 44/51 |
| 4,666,457 | 5/1990 | Hayes et al. | 44/51 |
| 4,842,616 | 6/1989 | Verhille | 44/51 |
| 4,872,929 | 8/1988 | Mullay | 149/46 |
| 4,992,249 | 2/1991 | Bowers | 423/235 |

FOREIGN PATENT DOCUMENTS

| | | |
|---|---|---|
| 53-128023 | 11/1978 | Japan . |
| 2-191528 | 7/1990 | Japan ................ 423/235 |

OTHER PUBLICATIONS

Control of NOx Emissions from Distillate Oil–Fired Gas Turbines—By Donald T. Brown, P.E. PSE&G and Alexander S. Dainoff, Nalco Fuel Tech—Presented at 1991 ASME Cogen–Turbo V. Budapest, Hungary, Sep. 3–5, 1991.

*Primary Examiner*—Michael Lewis
*Assistant Examiner*—Thomas G. Dunn, Jr.
*Attorney, Agent, or Firm*—St. Onge Steward Johnston & Reens

[57] ABSTRACT

The present invention relates to a process for reducing the nitrogen oxides level in an effluent from the combustion of a carbonaceous fuel, which involves preparing an emulsion of a nitrogen oxides reducing treatment agent and a hydrocarbon having a boiling point which is lower than that of said nitrogen oxides reducing treatment agent; and introducing said emulsion into the effluent from the combustion of a carbonaceous fuel under conditions effective to reduce the nitrogen oxides level therein.

3 Claims, No Drawings

PROCESS FOR ADJUSTING THE OPTIMUM EFFLUENT TEMPERATURE OF A NITROGEN OXIDES REDUCING TREATMENT AGENT

TECHNICAL FIELD

The present invention relates to a process and composition useful for adjusting the optimum effluent temperature for the reduction of nitrogen oxides (NOx, where x is an integer, generally 1 or 2) by the introduction of a nitrogen oxides reducing treatment agent into the effluent from the combustion of a carbonaceous fuel or other organic matter.

Carbonaceous fuels can be made to burn more completely and with reduced emissions of carbon monoxide and unburned hydrocarbons when the oxygen concentrations and air/fuel ratios employed are those which permit high flame temperatures. When fossil fuels are combusted in suspension fired boilers, such as large utility boilers, temperatures above about 2000° F. and typically about 2200° F. to about 3000° F. are generated.

Unfortunately, such high temperatures tend to cause the production of thermal NOx, the temperatures being so high that free radicals of oxygen and nitrogen are formed and chemically combine as nitrogen oxides. Nitrogen oxides can form even in circulating fluidized bed boilers which operate at temperatures typically ranging from 1300° F. to 1700° F., as well as gas turbines and diesel engines.

Nitrogen oxides are troublesome pollutants found in the combustion streams of boilers when fired as described above, and comprise a major irritant in smog. It is further believed that nitrogen oxides can undergo a process known as photochemical smog formation, through a series of reactions in the presence of some hydrocarbons. Moreover, nitrogen oxides comprise a significant contributor to acid rain and have been implicated as contributing to the undesirable depletion of the ozone layer in the upper atmosphere. They may also impact on the warming of the atmosphere commonly referred to as "the greenhouse effect". In addition, some or all of these effects are also believed to be attributable to nitrous oxide ($N_2O$), which is usually considered separately from NOx for regulatory purposes.

Recently, many processes for the reduction of NOx in combustion effluents have been developed. They can generally be segregated into two basic categories: selective and non-selective. The selective processes are more desirable because of economic considerations. Among selective nitrogen oxides reducing processes, there is a further division between selective catalytic reduction (SCR) and selective non-catalytic reduction (SNCR) processes. Although SCR processes are thought capable of achieving higher levels of nitrogen oxides reductions, SNCR processes are often preferred because of their greater economy and flexibility.

SNCR processes, which are temperature dependent, generally utilize a nitrogenous substance such as urea, ammonia, one or more of the hydrolysis products of urea or various ammonium salts, as well as non-nitrogenous substances included as "enhancers" for the nitrogenous substances. SNCR processes proceed in the gas phase by a complex series of free radical-mediated chemical reactions. Such reactions involve various nitrogen, hydrogen, oxygen, and carbon-containing species and radicals. Urea and ammonia differ, in that they appear to be most effective at different temperatures.

Unfortunately, due to limitations in the points at which access to a boiler effluent can be had for introduction of a treatment agent, due to water jacketing and other like considerations, it is not always possible to introduce a treatment agent at the effluent temperature at which it is most effective at reducing nitrogen oxides. In addition, variations in boiler operating load, as well as other combustion conditions can alter the temperature at a location where a treatment agent is being introduced, and thereby cause the treatment agent to be introduced at a temperature other than its optimum nitrogen oxides reducing temperature. This can result in either undertreatment of the effluent, with resulting emission of nitrogen oxides to the atmosphere unnecessarily or overtreatment of the effluent, which can be equally undesirable because it can lead to the emission of ammonia to the atmosphere, a condition commonly referred to as "ammonia slip".

BACKGROUND ART

Processes and compositions for the reduction of nitrogen oxides in the effluent from the combustion of a carbonaceous fuel have been developed extensively over recent years. With increased attention to the health risks and environmental damage caused by agents such as smog and acid rain, it is expected that NOx reduction research will continue to be pursued.

Problems relating to the nitrogenous treatment agent mediated reduction of nitrogen oxides have been addressed in the prior art. For instance, Lyon, in U.S. Pat. No. 3,900,554, indicates that the optimum temperature for nitrogen oxides reduction when the treatment agent comprises ammonia is between 1600° F. and 2000° F., more specifically between 1700° F. and 1900° F. When the effluent temperature at the point of introduction is less than 1600° F., Lyon teaches that a "reducing material", which can be a paraffinic, olefinic, and aromatic hydrocarbon such as gasoline or fuel oil, an oxygenated hydrocarbon, a nitrogenated hydrocarbon, a sulfonated hydrocarbon, carbon monoxide, or hydrogen be injected in combination with the ammonia to permit effective nitrogen oxides reduction at the lower temperatures. Arand, Muzio, and Sotter, in U.S. Pat. No. 4,208,386, disclose that urea has an optimum nitrogen oxides reducing temperature range of greater than 1600° F., but the range can be lowered to 1300° F. with the use of the Lyon reducing materials.

Bowers, in U.S. Pat. No. 4,992,249, teaches that the use of urea to achieve nitrogen oxides reductions at temperatures above 2000° F. can be effective where the concentration of the urea in solution is less than about 20% and the solution is introduced as droplets having a Sauter mean diameter of about 150 to about 10,000 microns.

What is desired, however, is a process and composition which is effective at controllably adjusting the optimum effluent temperature for nitrogen oxides reduction of a nitrogen oxides reducing treatment agent directly in response to changing effluent conditions.

DISCLOSURE OF INVENTION

The present invention relates to a process and a composition capable of reducing nitrogen oxides in a combustion effluent, which permits adjustment of the treatment agent to ensure that the effluent temperature at the point of introduction is within the optimum nitrogen oxides reduction temperature for the treatment agent. This is accomplished by forming an emulsion comprising the desired nitrogen oxides reducing treatment agent and a hydrocarbon which has a boiling point less than that of the treatment agent. It has been found that, when the boiling point of a hydrocarbon which is emulsified with a treatment agent is less than that of the treatment agent, the optimum effluent temperature for nitrogen oxides reduction using the treatment agent is "shifted" or adjusted to a lower temperature.

The process of the present invention is effective for reducing the nitrogen oxides content of the effluent from the combustion of carbonaceous fuels and other organic matter, including coal, oil, natural gas, and municipal solid waste (MSW).

The treatment agent to be introduced into the effluent comprises a nitrogenous composition, by which is meant a composition having at least one component which contains nitrogen as an element. The reduction of nitrogen oxides by such treatment agents comprises a selective, gas phase, free radical-mediated process, often referred to as selective non-catalytic reduction (SNCR).

Various nitrogenous compositions, in their pure and typical commercial forms, will generate effective gas-phase NOx reducing agents (e.g., the amidozine radical, NH.) when introduced in aqueous solution. Among the prominent nitrogenous compositions are ammonia; urea; urea precursors; one or more of the hydrolysis products of urea (such as ammonium carbamate, ammonium carbonate, ammonium bicarbonate); other ammonium salts; and various urea complexes, including a urea hydrolysate which consists of a unique structure of ammonium carbonate and ammonium bicarbonate in a complex with ammonium carbamate; products of the reaction of urea with itself or other compositions, related compositions, or mixtures of these. Also included among these compounds are ammonium carbonate, ammonium formate, ammonium citrate, ammonium acetate, ammonium oxalate, other ammonium salts (both organic and inorganic, but particularly of organic acids), ammonium hydroxide, various stable amines, guanidine, guanidine carbonate, biguanide, guanylurea sulfate, melamine, dicyanimide, calcium cyanamide, biuret, 1,1'azobisformamide, methylol urea, methylol urea-urea, dimethyl urea, hexamethylenetetramine (HMTA), or mixtures of the foregoing.

Enhancers are additive materials which modify the effectiveness of a pollutant-reducing agent in terms of its effective temperature window, its utilization efficiency, or the like. Among the enhancers which can be included with the treatment agent of this invention are the above materials when used in suitable combination, as well as other compositions such as hexamethylenetetramine (HMTA), oxygenated hydrocarbons such as ethylene glycol and methanol, ammonium salts of organic acids such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent, or mixtures of the foregoing. Exemplary of other suitable oxygenated hydrocarbons are ketones, aldehydes, alcohols including polyols, carboxylic acids, sugars, starch hydrolysates, hydrogenated starch hydrolysates, sugar-containing residues such as molasses, and mixtures of any of these. The entire disclosure of U.S. Pat. Nos. 4,719,092, 4,844,878, and 4,877,591, which describe suitable enhancers, are incorporated herein by reference.

Most preferred among the enhancers are the oxygenates, such as the oxygenated hydrocarbons, heterocyclic hydrocarbons having at least one cyclic oxygen, sugar and molasses. In fact, several of the enhancers, especially the oxygenates and certain of the ammonium salts, can themselves function in NOx-reducing treatment agents in an independent introduction.

The use of ammonia or urea as the nitrogenous treatment agent is most common, and disclosed by Lyon in U.S. Pat. No. 3,900,554, and Arand, Muzio, and Sotter in U.S. Pat. No. 4,208,386 and Arand, Muzio, and Teixeira in U.S. Pat. No. 4,325,924, the disclosures of each of which are incorporated herein by reference. The use of urea (as compared to ammonia) is preferred as the nitrogenous composition of this invention since the toxicity and instability of ammonia are avoided.

The use of the hydrolysis products of urea as well as a unique urea hydrolysate has been disclosed by von Harpe and Pachaly in International Patent Application entitled "Process for the In-Line Hydrolysis of Urea", having Publication No. WO 92/02291, filed Aug. 1, 1991; and von Harpe, Pachaly, Lin, Diep, and Wegrzyn in International Patent Application entitled "Nitrogen Oxides Reduction Using a Urea Hydrolysate", having Publication No. WO 92/02450, filed Aug. 1, 1991, the disclosures of each of which are incorporated herein by reference.

The introduction of the hydrolysis products of urea or a urea hydrolysate as the nitrogenous composition in the treatment agent can have significant advantages due to the ability of the urea hydrolysate to reduce nitrogen oxides over a relatively wide effluent temperature window, while minimizing the generation of nitrous oxide ($N_2O$), another pollutant.

Under the proper conditions, urea hydrolyzes to products which are believed to include ammonia ($NH_3$) ammonium carbamate ($NH_2COONH_4$) ("carbamate"), ammonium carbonate ($(NH_4)_2CO_3$) ("carbonate"), and ammonium bicarbonate ($NH_4HCO_3$) ("bicarbonate"). Hydrolysis generally continues sequentially from carbamate, through carbonate and then to bicarbonate, each composition being more stable than urea.

Although each of the noted hydrolysis products is individually commercially available, it is more desirable to produce them via urea hydrolysis under the conditions detailed below. This is because the thusly formed hydrolysate has advantages over the individual hydrolysis products, even if combined in the same approximate ratios. A primary advantage is cost, since urea can be significantly less expensive than the individual hydrolysis products. Additionally, a maximum solubility of about 25% for the hydrolysate (based on initial urea concentration) has been observed, which is superior to the solubility of bicarbonate, i.e., about 18%. This can be significant in terms of transportation costs and final treatment agent concentrations.

According to solubility and structural analyses, including high pressure liquid chromatography (HPLC) using phosphoric acid as solvent; carbon-13 nuclear magnetic resonance spectroscopy (NMR); thermal gravimetric analysis (TGA); differential scanning calorimetry (DSC); and measurement of "P" or "M" alkalinity by acid titration, the hydrolysate prepared according to the process detailed herein comprises at least in part a single unique structure of carbonate and bicarbonate which is in a complex with carbamate (expressed as carbamate.bicarbonate/carbonate).

If the pressure exerted on the hydrolysate solution is sufficiently high, ammonia also produced does not flash off, but remains in solution and remains available to contribute to the catalytic reduction of NOx. In addition, depending on the conditions employed, residual urea may also be present.

Although a urea solution will hydrolyze under ambient conditions, typically less than 1% will do so, an insignificant amount in terms of observable differences in effect. In forming the inventive hydrolysate, temperature, pressure, concentration of the initial urea solution, and residence time are all important parameters, and must be balanced. High pressure is particularly useful because the reaction proceeds in the direction of smaller mole volumes during the formation of carbamate and carbonate. Additionally, high pressure also helps ensure that hydrolysis proceeds in solution and not in the vapor phase. Higher temperature and longer residence times also result in higher levels of hydrolysis. However, under equivalent pressures, temperatures, and residence times, hydrolysis decreases with increases in solution concentration.

Advantageously, hydrolysis of a 10% aqueous urea solution should be conducted under pressures sufficiently high to maintain the resulting hydrolysate in solution. Such pressures will also facilitate hydrolysis. Desirably, hydrolysis is performed under pressures of at least about 500 pounds per square inch (psi), more preferably at least about 650 psi. If it is desired to maintain ammonia in solution, the pressure should be at least about 750 psi. As the concentration of the initial urea solution is increased, the pressure is preferably increased to achieve equivalent results.

There is no true upper limit of pressure in terms of facilitating hydrolysis; rather, any upper limits comprise practical as opposed to technical limits, since higher pressures, i.e., pressures above about 3000 psi, require vessels able to stand such pressures, which are generally more expensive and usually unnecessary.

At the desired pressures, the temperatures and residence times can be varied. Temperatures of only about 250° F. will ensure the presence of some hydrolysate (e.g., no more than about 5%), whereas temperatures of about 500° F. to 700° F. will ensure that virtually all the urea has been converted to hydrolysate. Residence times can vary between about three minutes and about 15 minutes, preferably about five minutes to about 10 minutes. It will be recognized that the upper temperature and residence time limits are less important since exceeding them will not result in lower levels of hydrolysis or a less effective hydrolysate, it is believed.

The temperature and residence time for urea hydrolysis are related, and one (i.e., time) can be decreased as the other (i.e., temperature) is increased. For instance, hydrolysis at 400° F. for 10 minutes may be generally equivalent to hydrolysis at 500° F. for five minutes and hydrolysis at 600° F. for three minutes.

As noted, hydrolysis proceeds to consecutively form carbamate, carbonate, and bicarbonate. Although all three are present even under the least severe conditions, it is desired that the ratio of carbamate to bicarbonate/carbonate in the hydrolysate be about 10:1 to about 1:20, more preferably about 2:1 to about 1:10 for greatest effectiveness. This can be achieved by hydrolyzing at a fluid temperature of at least about 325° F. for about five minutes or longer.

Most preferably, the hydrolysis of urea is conducted in the presence of metal catalysts such as copper catalysts like copper nitrate, nickel catalysts like nickel sulfate, and iron catalysts like iron (III) nitrate, with the copper and nickel catalysts preferred. Since such catalysts enhance urea hydrolysis, greater hydrolysis levels can be achieved with equivalent hydrolysis conditions by the use of the catalysts.

The catalyst metal is mixed into the urea solution prior to hydrolysis. For instance between about five and about 15, preferably about 10 parts per million (ppm) of catalyst (as metal) is mixed into a 10% urea solution, whereas about 20 to about 60 ppm, preferably about 50 ppm is mixed into a 25% urea solution.

In order to effectively supply sufficient urea hydrolysate to support the SNCR process, it is desired that at least about 25% of the urea be hydrolyzed. More preferably, at least about 60% of the urea is hydrolyzed, most preferably at least about 80%.

The level of hydrolysis achieved under any particular set of conditions can be determined, for instance, by measuring the "P" and "M" alkalinity of the hydrolyzed solution. For example, a 10% solution of urea has a pH of 7.3 with 0 "P" alkalinity and 0.002% "M" alkalinity as $CaCO_3$. When hydrolyzed, the hydrolysate has a pH of about 9.5, with up to 9% "P" alkalinity and 20.2% "M" alkalinity. By comparing the alkalinity of a hydrolyzed solution with a theoretical maximum, using the fresh urea solution as a reference, the level of hydrolysis can be estimated.

Hydrolysis level can also be determined using conductivity in the same manner as alkalinity can be used. The conductivity of a 10% urea solution is about 1.2 milli-mhos, whereas a 10% urea solution which has been hydrolyzed has a conductivity of about 120 milli-mhos.

When the treatment agent comprises urea, a urea hydrolysate or another nitrogenous treatment agent, without forming the emulsion of the present invention, it is preferably introduced at an effluent temperature of about 1500° F. to about 2000° F., more preferably about 1700° F. to about 1950° F.

The treatment agent is generally introduced into the effluent at a molar ratio of the nitrogen in the treatment agent to the baseline nitrogen oxides level in the effluent of about 1:10 to about 10:1. More preferably, the molar ratio of treatment agent nitrogen to baseline NOx level is about 1:5 to about 5:1. By "baseline nitrogen oxides level" is meant the level (measured or calculated) of nitrogen oxides in the effluent prior to introduction of the treatment agent. The baseline NOx level is also used in calculating the percentage of nitrogen oxides reduced by measuring the level of nitrogen oxides in the effluent after treatment, dividing that number by the baseline nitrogen oxides level, subtracting from unity and multiplying by 100 to give the NOx reduction expressed as percentage of baseline.

The treatment agent is supplied to the effluent as a solution, most preferably an aqueous solution, and its concentration in the solution will have an effect on reduction of the level of NOx in the effluent. The solution can be varied from saturated to very dilute. At higher effluent temperatures, the concentration of nitrogenous agent should preferably be more dilute, say less than about 20% at about 2000° F., and from about 0.5% to about 10% at these or higher temperatures. On the other hand, concentrations of from about 20% to about 40% are more typical for temperatures below about 2000° F. As used herein, the term "treatment agent" will be understood to comprise the nitrogenous agent in solution.

Advantageously, the size of the droplets of solution will be within the range of from about 10 to about 10,000, and preferably greater than about 50 microns. The droplet size is important to enable uniform mixing of the treatment agent with the effluent and penetration of the treatment agent sufficiently along the internal boiler path that it can achieve its intended function. Droplet size is also important to control evaporation rate. The size of the droplets will preferably be increased with increasing temperature. At temperatures below about 2000° F., droplet sizes of less than about 150 microns are effective, while at higher temperatures the droplets should be larger, and preferably larger than about 500 microns.

Even given the flexibility provided by solution concentration and droplet size, limitations in boiler access points, and changes in boiler load often create situations where the treatment agent is introduced into the effluent at an effluent temperature outside of its optimum range which, as discussed above, is extremely undesirable. When NOx-reductions achieved using nitrogenous agents are plotted against temperature, the resulting curve is generally bell shaped, with a maximum between about 1700° F. and about 1950° F. As the temperature at which NOx reductions are measured lowers, the reductions. achieved are substantially lower, until, at 1450° F., they are nominal. At temperatures significantly below 1450° F., virtually no reduction in nitrogen oxide levels are observed.

Where the effluent temperature at the point of introduction is substantially less than the optimum effluent temperature of the treatment agent, an emulsion can be formed between the nitrogen oxides reducing treatment agent and a hydrocarbon having a boiling point which is less than that of the treatment agent.

When the treatment agent comprises an aqueous solution of ammonia, urea, a urea hydrolysate or other nitrogenous composition, the boiling point can be considered to be about 212° F. Accordingly, for adjusting the optimum effluent temperature range for the nitrogen oxides reducing treatment agent downward, the hydrocarbon to be emulsified therein must have a boiling point below about 212° F.

Although any difference in boiling point between the hydrocarbon and the nitrogen oxides reducing treatment agent will affect the optimum effluent temperature range of the treatment agent, it is preferred that the boiling point between the two differ by at least about 10° F., and more preferably at least about 20° F. for a quantifiable difference in optimum effluent temperature range to be noted. Where the treatment agent solution is not aqueous (and does not have a boiling point of about 212° F.), the difference in temperature should be about 5%, and more preferably about 10%, of the treatment agent boiling point for a noticeable effect.

Exemplary of hydrocarbons having boiling points below about 212° F., and which can be emulsified into an aqueous treatment agent to reduce its optimum effluent temperature range are light crude naphtha fuel oils. Light crude naphtha fuel oils are fuel oils having little or no aromatic compounds and which consist essentially of relatively low molecular weight aliphatic and naphthenic hydrocarbons. In the refining arts, light crude naphtha refers specifically to the first liquid distillation fraction. Such fuel oils generally have a boiling range between about 90° F. and about 175° F. "Naphthenic" is an industrial term which refers to fully saturated cyclic hydrocarbons having the general formula $C_nH_{2n}$. "Aliphatic" is an industrial term which refers to fully saturated linear hydrocarbons having the general formula $C_nH_{2n+2}$. These hydrocarbons include those which have a viscosity of about 5 ssf to about 125 ssf, preferably about 38 ssf to about 100 ssf at 100° F. and a specific gravity of about 0.80 to about 0.95 at 77° F. They include fuels conventionally known as diesel fuel, distillate fuel, #2 oil, or #4 oil, as defined by the American Society of Testing and Measurement (ASTM), standard specification for fuel oils (designation D396-86), as well as mixtures thereof.

Also included as "low", (i.e., below about 212° F.) boiling point hydrocarbons are hexane, which has a boiling point of 69° F.; and ethyl ether, which has a boiling point (at 760 atmospheres) of 34.6° F. Most preferred of the low boiling point hydrocarbons are hexane and the light crude naphtha fuel oils, especially diesel fuel.

The hydrocarbon is emulsified into the nitrogen oxides reducing treatment agent at a level which advantageously varies between about 1%, more preferably about 5%, of the resulting emulsion, up to about 45% of the resulting emulsion. The higher the level of hydrocarbon present in the emulsion, the greater the changes in optimum effluent temperature for nitrogen oxides reduction. For instance, if an optimum temperature for nitrogen oxides reduction of 1900° F. is observed for a 25% aqueous solution of urea, an emulsion having a weight ratio of the urea solution to diesel fuel of about 9:1 will reduce the peak temperature to about 1500° F. and an emulsion with a weight ratio of 6:4 will reduce the peak temperature to about 1300° F.

The inventive emulsions are prepared such that the discontinuous phase (i.e., the hydrocarbon) preferably has a particle size wherein at least about 70% of the droplets are below about 5 microns Sauter mean diameter. More preferably, at least about 85%, and most preferably at least about 90%, of the droplets are below about 5 microns Sauter mean diameter for emulsion stability.

Emulsion stability is largely related to droplet size. The primary driving force for emulsion separation is the large energy associated with placing oil molecules in close proximity to water molecules in the form of small droplets. Emulsion breakdown is controlled by how quickly droplets coalesce. Emulsion stability can be enhanced by the use of surfactants and the like, which act as emulsifiers or emulsion stabilizers. These generally work by forming repulsive layers between droplets prohibiting coalescence.

The gravitational driving force for phase separation is much more prominent for large droplets, so emulsions containing large droplets separate most rapidly. Smaller droplets also settle, but can be less prone to coalescence, which is the cause of creaming. If droplets are sufficiently small, the force of gravity acting on the droplet is small compared to thermal fluctuations or subtle mechanical agitation forces. In this case the emulsion can become stable almost indefinitely, although given a long enough period of time or a combination of thermal fluctuations these emulsions will eventually separate.

Advantageously, an emulsifier composition is utilized to maintain the emulsion. The emulsifier composition preferably comprises about 25% to about 85% by weight of an amide, especially an alkanolamide or n-substituted alkyl amine; about 5% to about 25% by weight of a phenolic surfactant; and about 0% to about 40% by weight of a difunctional block polymer terminating in a primary hydroxyl group. More preferably, the amide comprises about 45% to about 65% of the emulsifier composition; the phenolic surfactant about 5% to about 15%; and the difunctional block polymer about 30% to about 40% of the emulsifier composition.

Suitable n-substituted alkyl amines and alkanolamides which can function to stabilize the emulsion of the present invention are those formed by the condensation of, respectively, an alkyl amine and an organic acid or a hydroxyalkyl amine and an organic acid, which is preferably of a length normally associated with fatty acids. They can be mono-, di-, or triethanolamines and include any one or more of the following: oleic diethanolamide, cocamide diethanolamine (DEA), lauramide DEA, polyoxyethylene (POE) cocamide, cocamide monoethanolamine (MEA), POE lauramide DEA, oleamide DEA, linoleamide DEA, stearamide MEA, and oleic triethanolamine, as well as mixtures thereof. Such alkanolamides are commercially available, including those under trade names such as Clindrol 100-0, from Clintwood Chemical Company of Chicago, Ill.; Schercomid ODA, from Scher Chemicals, Inc. of Clifton, N.J.; Schercomid SO-A, also from Scher Chemicals, Inc.; and Mazamide®, and the Mazamide series from PPG-Mazer Products Corp. of Gurnee, Ill.

The phenolic surfactant is preferably an ethoxylated alkyl phenol such as an ethoxylated nonylphenol or octylphenol, especially ethylene oxide nonylphenol which is available commercially under the tradename Triton N from Union Carbide Corporation of Danbury, Conn. and Igepal CO from Rhone-Poulenc Company of Wilmington, Del.

The block polymer which is an optional element of the emulsifier composition of the present invention advantageously comprises a nonionic, difunctional block polymer which terminates in a primary hydroxyl group and has a molecular weight ranging from about 1,000 to above about 15,000. Such polymers are generally considered to be polyoxyalkylene derivatives of propylene glycol and are commercially available under the tradename Pluronic from BASF-Wyandotte Company of Wyandotte, N.J. Preferred among these polymers are propylene oxide/ethylene oxide block polymers commercially available as Pluronic 17R1.

In addition to the noted components, the emulsifier composition may further comprise up to about 30% and preferably about 10 to about 25% of a light crude naphtha fuel oil. It has been found that inclusion of the fuel oil in the emulsifier composition can in some cases increase emulsion stability of the emulsion itself. In addition, other components such as salts of alkylated sulfates or sulfonates such as sodium lauryl sulfate and alkanolamine sulfonates may also be included in the emulsifier composition.

The use of the noted emulsifier composition provides chemical emulsification, which is dependent on hydrophylic-lipophylic balance (HLB), as well as on the chemical nature of the emulsifier. The HLB of an emulsifier is an expression of the balance of the size and strength of the hydrophylic and the lipophylic groups of the composition. The HLB system, which was developed as a guide to emulsifiers by ICI Americas, Inc. of Wilmington, Del. can be determined in a number of ways, most conveniently for the purposes of this invention by the solubility or dispersability characteristics of the emulsifier in water, from no dispersability (HLB range of 1–4) to clear solution (HLB range of 13 or greater).

The emulsifiers useful should most preferably have an HLB of 8 or less, meaning that after vigorous agitation they form a milky dispersion in water (HLB range of 6–8), poor dispersion in water (HLB range of 4–6), or show no dispersability in water (HLB range of less than 4). Although the precise explanation is unknown, it is believed that the inventive emulsification system provides superior emulsification because it comprises a plurality of components of different HLB values. Desirably, the emulsifier composition has a combined HLB of at least about 4.0, more preferably about 5.1 to about 7.0 to achieve this superior emulsification.

For instance, an emulsifier composition which comprises 70% oleic diethanolamide (average HLB 6), 10% ethylene oxide nonylphenol (average HLB 13), and 20% #2 fuel oil has a combined HLB of about 5.5 (70%×6 plus 10%×13). An emulsification system which comprises 50% oleic diethanolamide, 15% ethylene oxide nonylphenol and 35% of a propylene oxide/ethylene oxide block polymer (average HLB 2.5) has a combined HLB of about 5.8 (50%× 6 plus 15%×13 plus 35%×2.5). Such emulsifier compositions would provide superior emulsification as compared with an emulsifier comprising 80% oleic diethanolamine and 20% #2 fuel oil, which has an HLB of about 4.8 (80%× 6).

Desirably, the emulsifier composition should be present at a level which will ensure effective emulsification. Preferably, the emulsifier composition is present at a level of at least about 0.05% by weight of the emulsion to do so. Although there is no true upper limit to the amount of the emulsifier composition which is present, with higher levels leading to greater emulsification and for longer periods, there is generally no need for more than about 5.0% by weight, nor, in fact, more than about 3.0% by weight.

It is also possible to utilize a physical emulsion stabilizer in combination with the emulsifier composition noted above to maximize the stability of the emulsion achieved in the process of the present invention. Use of physical stabilizers also provides economic benefits due to their relatively low cost. Although not wishing to be bound by any theory, it is believed that physical stabilizers increase emulsion stability by increasing the viscosity of immiscible phases such that separation of the oil/water interface is retarded. Exemplary of suitable physical stabilizers are waxes, cellulose products, and gums such as whalen gum and xanthan gum.

When utilizing both the emulsifier composition and physical emulsion stabilizers, the physical stabilizer is present in an amount of about 0.05% to about 5% by weight of the combination of chemical emulsifier and the physical stabilizer. The resulting combination emulsifier/stabilizer can then be used at the same levels noted above for the use of the emulsifier composition.

The emulsion used in the process of the present invention can be formed using a suitable mechanical emulsifying apparatus which would be familiar to the skilled artisan. Advantageously, the apparatus is an in-line emulsifying device for most efficiency. The emulsion is formed by feeding both the nitrogen oxides reducing treatment agent and the hydrocarbon in the desired proportions to the emulsifying apparatus, and when an emulsifier composition is employed it can either be admixed or dispersed into one or both of the components before emulsification or can be added to the emulsion after it is formed. Preferably, the emulsifier composition is present at the time of emulsifying the treatment agent and hydrocarbon. Most advantageously, the emulsifier composition is provided in the aqueous phase (i.e., the treatment agent), depending on its HLB.

The emulsions of the present invention can be prepared where the temperature of the effluent at the point of introduction is known, and its variance from the optimum effluent temperature range for the desired nitrogen oxides reducing treatment agent can be determined. In addition, an emulsifying apparatus can be provided and at the ready to emulsify low boiling point hydrocarbon into the nitrogen oxides reducing treatment agent when a significant (i.e., efficiency reducing) reduction in effluent temperature at the point of introduction is determined.

For instance, if in response to a change in operating load or other conditions, the effluent temperature at the location for introduction becomes lower than the optimum effluent temperature range for the nitrogen oxides reducing treatment agent, the emulsifying system can be engaged by an appropriate signal and emulsification of low boiling point hydrocarbon into the treatment agent can be effected, which then lowers the optimum temperature of the treatment agent into the range within which the new effluent temperature is situated. In this way, a simple yet effective mechanism for responding to common changes in effluent temperature at a location for introduction can be installed and maintained.

Although not wishing to be bound by any theory, it is believed that the emulsion of the present invention permits adjustment of the optimum temperature for nitrogen oxides reduction by "micro-explosion" of the droplets of hydrocarbon within the treatment agent to improve atomization. More specifically, the hydrocarbon will produce the micro-explosion because it approaches its boiling point first and becomes superheated while the treatment agent is still below its boiling point. At a point of high superheat, referred to as nucleaction temperature, the hydrocarbon boils explosively to form many smaller fragments, leaving no solids or unburned carbon residues, and is kineticly reactive. This micro-explosion ensures uniform particle distribution, small particle size, and rapid reaction of the treatment chemical. The vaporization of the chemical treatment agent can then undergo further vapor phase reactions with NOx. These reactions are believed to be major factors in more efficient use of the treatment agent chemical.

The following examples further illustrate and explain the invention, but are not considered limiting.

EXAMPLE I

The burner used is a burner having an effluent flue conduit, known as a flame tube, approximately 209 inches in length and having an internal diameter of eight inches and walls two inches thick. The burner has a flame area adjacent the effluent entry port and flue gas monitors adjacent the effluent exit port to measure the concentration of compositions, including nitrogen oxide, nitrous oxide, and other compounds of interest which may be present in the effluent. The effluent flue conduit additionally has a thermocouple for temperature measurement disposed through ports in the interior at several points.

The burner is fired using #2 oil and the compositions to be injected into the effluent at injected at a point where the effluent temperature is known. The following runs are made:

Run 1—a 5% aqueous solution of urea is introduced at a normalized stoichiometric ratio (NSR) of about 1.0 at an effluent temperature of 1450° F.;

Run 2—an emulsion comprising 10% hexane by weight in the urea solution of Run 1 is introduced at effluent temperatures of 1450° F. and 1250° F.;

Run 3—an emulsion comprising 8% hexane by weight in the urea solution of Run 1 is introduced at effluent temperatures of 1450° F., 1350° F., and 1250° F.;

Run 4—an emulsion comprising 5% hexane by weight in the urea solution of Run 1 is introduced at an effluent temperature of 1100° F.; and Run 5—an emulsion comprising 1% hexane by weight in the urea solution of Run 1 is introduced at effluent temperatures of 1250° F. and 1100° F.

The results, including the percent NOx reduction, and levels of CO, $N_2O$, and $NH_3$ in parts per million (ppm) are set out in Table 1.

TABLE 1

| Run | Temp (°F.) | % NOx Reduction | CO (ppm) | $N_2O$ (ppm) | $NH_3$ (ppm) |
| --- | --- | --- | --- | --- | --- |
| 1 | 1450 | 5 | 0 | 0 | 192 |
| 2 | 1450 | 54 | 100 | 74 | 73 |
|   | 1250 | 40 | 550 | 20 | 68 |
| 3 | 1450 | 49 | 17 | 6 | 17 |
|   | 1350 | 51 | 57 | 36 | 21 |
|   | 1250 | 41 | 205 | 40 | 82 |
| 4 | 1100 | 35 | 400 | 35 | 51 |
| 5 | 1250 | 30 | 55 | 5 | 70 |
|   | 1100 | 32 | 48 | 5 | 80 |

EXAMPLE II

The procedure of Example I is repeated, except that the following runs are made:

Runs 1a–1e—an aqueous solution of urea is introduced at a normalized stoichiometric ratio (NSR) of about 1.0 at effluent temperatures of 1050° F., 1200° F., 1350° F., 1450° F., and 1550° F.;

Runs 2a–2e—an emulsion comprising 40% diesel fuel by weight in the urea solution of Runs 1a–1e is introduced at effluent temperatures of 1100° F., 1250° F., 1350° F., 1450° F., and 1550° F.;

Runs 3a–3c—an emulsion comprising 20% diesel fuel by weight in the urea solution of Runs 1a–1e is introduced at effluent temperatures of 1110° F., 1200° F., and 1250° F.;

Runs 4a–4e—an emulsion comprising 10% diesel fuel by weight in the urea solution of Runs 1a–1e is introduced at effluent temperatures of 1100° F., 1250° F., 1350° F., 1450° F., and 1550° F.

TABLE 2

| Run | Temp (°F.) | % NOx Reduction |
| --- | --- | --- |
| 1a | 1050 | 1.0 |
| 1b | 1200 | 3.0 |
| 1c | 1350 | 6.0 |
| 1d | 1450 | 10.0 |
| 1e | 1550 | 17.0 |
| 2a | 1100 | 31.0 |
| 2b | 1250 | 48.0 |
| 2c | 1350 | 48.0 |
| 2d | 1450 | 35.0 |
| 2e | 1550 | 10.0 |
| 3a | 1110 | 32.0 |
| 3b | 1200 | 32.0 |
| 3c | 1250 | 29.0 |
| 4a | 1100 | 30.0 |
| 4b | 1250 | 31.0 |
| 4c | 1350 | 33.0 |
| 4d | 1450 | 53.0 |
| 4e | 1550 | 51.0 |

It will be seen that NOx reductions at lower temperatures are significantly improved by the use of the emulsions of the present invention. Although the use of diesel fuel, as compared to hexane, was found to have disadvantages in terms of byproduct production, both types of emulsions led to significant improvement in the reduction of nitrogen oxides.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention, which is defined by the following claims.

What is claimed is:

1. A process for reducing the nitrogen oxides level in an effluent from the combustion of a carbonaceous fuel, which comprises preparing a water and hydrocarbon emulsion comprising a nitrogen oxides reducing treatment agent, wherein the reducing agent is an aqueous solution comprising a component selected from the group consisting of ammonia, urea, urea precursors, one or more of the hydrolysis products of urea, ammonium salts, urea complexes, amines, guanidine, guanidine carbonate, biguanidine, guanylurea sulfate, dicyanimide, calcium cyanimide, biuret, 1,1'-azobisformamide, methylol urea, a methylol urea-urea condensation product, dimethyl urea, and mixtures thereof;

and a hydrocarbon having a boiling point which is lower than that of said nitrogen oxides reducing treatment agent, wherein the hydrocarbon comprises a component selected from the group consisting of a light crude naphtha fuel oil, hexane, ethyl ether, and mixtures thereof; and introducing said emulsion into the effluent from the combustion of a carbonaceous fuel under conditions effective to reduce the nitrogen oxides level therein.

2. The process of claim 1, wherein the amount of said hydrocarbon present in said emulsion is varied in response to changes in effluent temperature.

3. The process of claim 1, wherein said emulsion comprises between about 1% and about 45% hydrocarbon by weight.

* * * * *

UNITED STATES PATENT AND TRADEMARK OFFICE
CERTIFICATE OF CORRECTION

PATENT NO.  : 5,453,257
DATED       : September 26, 1995
INVENTOR(S) : Daniel V. Diep
              M. Linda Lin It is certified that error appears in the above-indentified patent and that said Letters Patent is hereby corrected as shown below:

At Column 3, line 21, "NH." should read --NH•--.

At Column 4, line 64, "carbamate.bicarbonate" should read --carbonate•bicarbonate--.

At Column 7, line 17, delete "." immediately after "reductions".

Signed and Sealed this

Nineteenth Day of March, 1996

Attest:

BRUCE LEHMAN

Attesting Officer

Commissioner of Patents and Trademarks